United States Patent
Yasuda (10) Patent No.: US 11,094,068 B2
(45) Date of Patent: Aug. 17, 2021

(54) IMAGE PROCESSING METHOD AND IMAGE PROCESSOR

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 42 days.

(21) Appl. No.: 16/485,572

(22) PCT Filed: Nov. 6, 2017

(86) PCT No.: PCT/JP2017/039910
§ 371 (c)(1),
(2) Date: Aug. 13, 2019

(87) PCT Pub. No.: WO2018/173352
PCT Pub. Date: Sep. 27, 2018

(65) Prior Publication Data
US 2020/0005466 A1    Jan. 2, 2020

(30) Foreign Application Priority Data

Mar. 24, 2017   (JP) .............. JP2017-058512
Mar. 24, 2017   (JP) .............. JP2017-058513

(51) Int. Cl.
 *G06T 7/13*    (2017.01)
 *G06K 9/46*    (2006.01)
 *G06K 9/00*    (2006.01)

(52) U.S. Cl.
 CPC .............. *G06T 7/13* (2017.01); *G06K 9/0014* (2013.01); *G06K 9/4604* (2013.01); *G06T 2207/30024* (2013.01)

(58) Field of Classification Search
 CPC ....... G06T 7/13; G06K 9/4604; G06K 9/0014
 (Continued)

(56) References Cited

U.S. PATENT DOCUMENTS

2003/0099397 A1* 5/2003 Matsugu .............. H04N 19/503
                                                                    382/173
2009/0010482 A1   1/2009 Nishida et al.
(Continued)

FOREIGN PATENT DOCUMENTS

JP    2005-346385 A    12/2005
JP    2007-058634 A     3/2007
(Continued)

OTHER PUBLICATIONS

International Search Report issued in corresponding International Patent Application No. PCT/JP2017/039910, dated Jan. 23, 2018, with English Translation.
(Continued)

*Primary Examiner* — Ayodeji O Ayotunde
(74) *Attorney, Agent, or Firm* — McDermott Will & Emery LLP (57) ABSTRACT

An image processing method is for detecting the edge of a well where cells are analyzed, from image data obtained by capturing the well and surroundings of the well, and an edge coordinate group for the well is extracted from the image data. If a plurality of edge coordinate groups has been extracted, edge candidates for the well are generated for each of the plurality of edge coordinate groups. Then, an edge candidate that satisfies a predetermined reference value is selected from among the generated edge candidates. If a plurality of edge candidates has been selected, relative evaluations are conducted to determine the edge of the analysis region from among the plurality of edge candidates.

16 Claims, 8 Drawing Sheets

(58) Field of Classification Search
USPC .......................................................... 382/133
See application file for complete search history.

(56) References Cited

U.S. PATENT DOCUMENTS

2009/0225180 A1    9/2009  Maruyama et al.
2011/0285837 A1*  11/2011  Bello ........................ G06T 7/12
                                                          348/79

FOREIGN PATENT DOCUMENTS

| JP | 2007-272435 A | 10/2007 |
| JP | 2013-526717 A | 6/2013 |
| JP | 2015-158737 A | 9/2015 |
| JP | 5920994 B2 | 5/2016 |
| TW | M504301 U | 7/2015 |

OTHER PUBLICATIONS

Taiwanese Office Action issued in corresponding Taiwanese Patent Application No. 106139240, dated Nov. 15, 2018.
Japanese Notice of Reasons for Refusal issued in corresponding Japanese Patent Application No. 2017-058512, dated Jun. 29, 2021.

* cited by examiner

Fig. 10

IMAGE PROCESSING METHOD AND IMAGE PROCESSOR

CROSS REFERENCE

This application is the U.S. National Phase under 35 U.S.C. § 371 of International Application No. PCT/JP2017/039910, filed on Nov. 6, 2017, which claims the benefits of Japanese Application No. 2017-058512, filed on Mar. 24, 2017 and Japanese Application No. 2017-058513, filed on Mar. 24, 2017, the entire contents of which are hereby incorporated by reference.

TECHNICAL FIELD

The present invention relates to an image processing method and an image processor in which the edge (e.g., contour or line) of an analysis region where an object is analyzed is detected from image data obtained by capturing an image of the analysis region and surroundings of the analysis region.

BACKGROUND ART

Analyses on biological cells use a flat plate-like tool with a plurality of wells (depressions), called a well plate or a microplate. The cells serving as targets for analysis are held together with a culture solution in the plurality of wells. Then, images of the cells are captured with a camera and analyzed. In the image capture with the camera, each well and its surroundings are captured. Thus, it is necessary to accurately detect the boundary of a well wall that defines the range of analysis of cells during image processing.

Patent Literature 1 discloses a method of identifying the wall boundary of a test well in a microplate. According to the method disclosed in Patent Literature 1, features of the wall boundary of a test well are detected from an image of the microplate. Then, the features of the wall boundary are used to generate a candidate edge image of the wall boundary. Through analysis of this candidate edge image, the spatial location of the outer perimeter boundary of the test well is calculated, and that information is used to determine the inner perimeter boundary. This inner perimeter boundary is assumed to be a test well region.

CITATION LIST

Patent Literature

Patent Literature 1: Japanese Patent No. 5920994

SUMMARY OF INVENTION

Technical Problem

In Patent Literature 1, a liquid such as a culture solution is held in the wells, and therefore a concave meniscus is formed at the surface of the liquid (curve in the liquid) by surface tension. In this case, light refraction occurs at the surface of the liquid, and this may make it difficult to accurately detect the outer perimeter boundary of the test well. As a result, the inner perimeter boundary of the test well cannot be detected accurately with Patent Literature 1 in which the inner perimeter boundary of the test well is determined from the spatial location of the outer perimeter boundary of the test well. If it is not possible to detect the inner perimeter boundary of the test well, an erroneous analysis region may be used for the analysis of the cells, and an accurate analysis result may not be acquired.

Also, with Patent Literature 1, there are cases where cells that are densely packed on the well wall surface in the well or impurities in the culture solution are generated as a candidate edge image of the wall boundary of the well. In such a case, an erroneous test well region may be detected, and the cells may not be analyzed accurately.

The present invention has been made in view of such circumstances, and it is an object of the present invention to provide an image processing method and an image processor that enable accurate detection of an analysis region.

Solution to Problem

To solve the above-described problems, a first aspect of the present invention is an image processing method of detecting an edge of an analysis region where an object is analyzed, from image data obtained by capturing an image of the analysis region and surroundings of the analysis region. The method includes the steps of a) extracting an edge coordinate group for the analysis region from the image data, b) in a case where a plurality of edge coordinate groups has been extracted in the step a), generating edge candidates for the analysis region from each of the plurality of edge coordinate groups, c) selecting an edge candidate that satisfies a predetermined reference value from among the edge candidates generated in the step b), and d) in a case where a plurality of edge candidates has been selected in the step c), conducting relative evaluations to determine the edge of the analysis region from among the plurality of edge candidates.

A second aspect of the present invention is the image processing method according to the first aspect, in which in the step b), edge candidates are generated using polynomial approximation for each of the plurality of edge coordinate groups.

A third aspect of the present invention is the image processing method according to the second aspect, in which in the step c), an edge candidate is selected that is generated from an edge coordinate group that includes a predetermined number or more of edge coordinates whose distances from the edge candidate is less than or equal to a first permissible value.

A fourth aspect of the present invention is the image processing method according to the first to third aspects, in which the step c) includes the steps of c1) for each of the edge candidates generated in the step b), detecting the number of missing edge coordinates that are used to specify the edge candidate, c2) for each the edge candidates generated in the step b), detecting a missing range where the edge coordinates are missing continuously, c3) calculating a selection indicator from the detected number of missing edge coordinates and the detected missing range, and c4) selecting an edge candidate whose calculated selection indicator is greater than or equal to a second permissible value.

A fifth aspect of the present invention is the image processing method according to the first to fourth aspects, in which in the step c), a statistic that measures distances between each of the edge candidates generated in the step b) and neighborhood edge coordinates of the edge candidate is calculated, and an edge candidate is selected based on the calculated statistic.

A sixth aspect of the present invention is the image processing method according to the first to fifth aspects, in which the analysis region has a circular shape. The method further includes the step of e) acquiring an ideal diameter of the analysis region, the ideal diameter being stored in advance. In the step c), an edge candidate whose diameter is within a first tolerance of the ideal diameter is selected from among the edge candidates generated in the step b).

A seventh aspect of the present invention is the image processing method according to the sixth aspect, in which in the step c), an edge candidate whose central coordinates are within a second tolerance from predetermined central coordinates is selected from among the edge candidates generated in the step b).

An eighth aspect of the present invention is the image processing method according to the sixth or seventh aspect, in which in the step d), an edge candidate that has a smallest diameter among the plurality of edge candidates is determined as the edge of the analysis region.

A ninth aspect of the present invention is the image processing method according to the sixth to eighth aspects, in which in the step d), the edge of the analysis region is determined by detecting central coordinates that are located outside a predetermined range from among central coordinates of the plurality of edge candidates, and excluding an edge candidate whose central coordinates are located outside the predetermined range from among the plurality of edge candidates.

A tenth aspect of the present invention is the image processing method according to the first to ninth aspects, in which in the step d), a score value is calculated for each of the edge candidates generated in the step b), and the edge of the analysis region is determined based on the calculated score value.

An eleventh aspect of the present invention is an image processing method of detecting an edge of an analysis region where an object is analyzed, from image data obtained by capturing an image of the analysis region and surroundings of the analysis region. The method includes the steps of a) extracting edge feature information that corresponds to an edge coordinate group for the analysis region, together with the edge coordinate group, from the image data, b) in a case where a plurality of edge coordinate groups has been selected in the step a), selecting an edge coordinate group in accordance with the edge feature information from among the plurality of edge coordinate groups, and c) generating an edge candidate for the analysis region from the edge coordinate group selected in the step b).

A twelfth aspect of the present invention is the image processing method according to the eleventh aspect, in which the edge feature information includes at least one of a direction of an edge direction specified by the edge coordinate group, an intensity of the edge, the number of pixels that constitute the edge, and maximum luminance and minimum luminance at the edge.

A thirteenth aspect of the present invention is the image processing method according to the eleventh or twelfth aspect, in which in the step c), an edge candidate is generated using polynomial approximation from the edge coordinate group.

A fourteenth aspect of the present invention is the image processing method according to the eleventh to thirteenth aspects. The method further includes the step of d) in a case where a plurality of edge coordinate groups has been selected in the step b) and a plurality of edge candidates has been generated in the step c), selecting an edge candidate in accordance with the edge feature information from among the plurality of edge candidates.

A fifteenth aspect of the present invention is an image processor that includes a camera that captures an image of an analysis region where an object is analyzed, and surroundings of the analysis region, and a controller that processes image data obtained by image capture with the camera. The controller executes the steps of a) extracting an edge coordinate group for the analysis region from the image data, b) in a case where a plurality of edge coordinate groups has been extracted in the step a), generating edge candidates for the analysis region, for each of the plurality of edge coordinate groups, c) selecting an edge candidate that satisfies a predetermined reference value from among the edge candidates generated in the step b), and d) in a case where a plurality of edge candidates has been selected in the step c), conducting relative evaluations to determine the edge of the analysis region from among the plurality of edge candidates.

A sixteenth aspect of the present invention is an image processor that includes a camera that captures an image of an analysis region where an object is analyzed, and surroundings of the analysis region, and a controller that processes image data obtained by image capture with the camera. The controller executes the steps of a) extracting edge feature information that corresponds to an edge coordinate group for the analysis region, together with the edge coordinate group, from the image data, b) in a case where a plurality of edge coordinate groups has been extracted in the step a), selecting an edge coordinate group in accordance with the edge feature information from among the plurality of edge coordinate groups, and c) generating an edge candidate for the analysis region from the edge coordinate group selected in the step b).

Advantageous Effects of Invention

According to the first to tenth and fifteenth aspects of the present invention, even if a plurality of edge coordinate groups is detected and a plurality of edge candidates is generated due to the influence of, for example, light refraction or foreign substances, the edge of the analysis region can be detected accurately by narrowing down the edge candidates through the use of the reference value and relative evaluations. By grasping the edge of the analysis region, it is possible to accurately analyze the object.

According to the eleventh to fourteenth and sixteenth aspects of the present invention, even if a plurality of edge coordinate groups for specifying the edge of the analysis region is detected due to the influence of, for example, light refraction or foreign substances, the plurality of edge coordinate groups can be narrowed down by using the edge feature information. Also, even if a detected edge coordinate group includes edge coordinates that include disturbance elements, these unnecessary edge coordinates can be eliminated by using the edge feature information. As a result, the edge of the analysis region can be determined accurately. By grasping the edge of the analysis region, it is possible to accurately analyze the object.

In particular, the second aspect of the present invention enables highly robust edge detection.

In particular, the fourth aspect of the present invention improves reliability in determining the edge of the analysis region.

In particular, the seventh aspect of the present invention improves reliability in determining the edge of the analysis region by eliminating, from among the plurality of edge candidates, an edge candidate whose central coordinates deviate considerably from predetermined central coordinates.

In particular, the ninth aspect of the present invention improves reliability in determining the edge of the analysis region by eliminating, from among the plurality of edge candidates, an edge candidate whose central coordinates deviate considerably from the central coordinates of the other edge candidates.

In particular, the thirteenth aspect of the present invention increases the image processing speed.

In particular, according to the fourteenth aspect of the present invention, even if a plurality of edge candidates is generated, the plurality of edge candidates can be narrowed down by using the edge feature information. As a result, the edge of the analysis region can be determined accurately. Also, by grasping the edge of the analysis region, it is possible to accurately analyze the object.

DESCRIPTION OF EMBODIMENTS

Preferred embodiments of the present invention will be described hereinafter with reference to the drawings. In the following description, an "image processor" according to the present invention is described as an image capturing device that captures images of a well plate that has been set. Then, an "image processing method" according to the present invention is described as being executed by this image capturing device.

1. Configuration of Image Capturing Device

Figure 1:
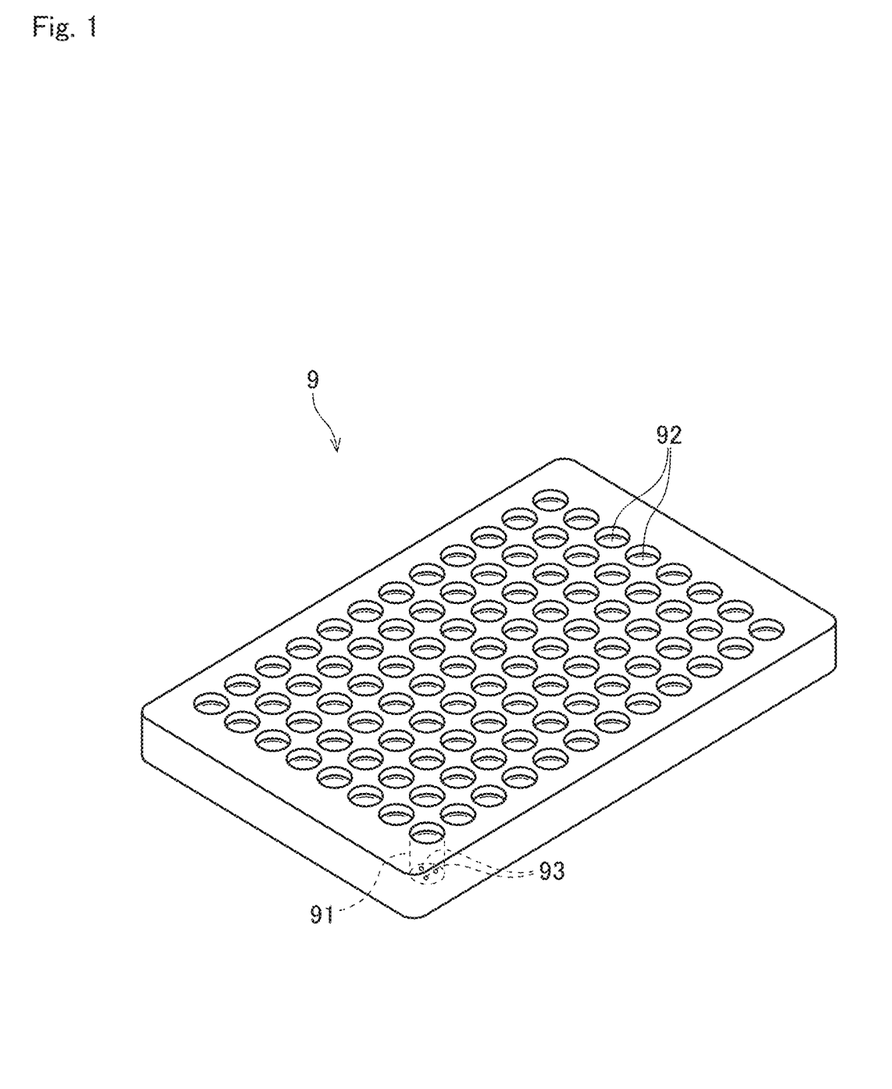
FIG. 1 is a perspective view illustrating an example of a well plate that is set in an image capturing device.

FIG. 1 is a perspective view illustrating an example of a well plate 9 that is set in an image capturing device 1.

The well plate 9 is a generally plate-like specimen container with a plurality of wells 91. The material for the well plate 9 is, for example, a transparent resin that transmits light. The plurality of wells 91 is arranged regularly in the upper surface of the well plate 9. The wells 91 hold a plurality of cells 93 serving as targets for analysis, together with a culture solution 92. The insides of the wells 91 are analysis regions where the cells 93 are analyzed. In the present embodiment, the wells 91 are described as having the shape of a circle when viewed from above. However, the wells 91 may have a different shape such as a rectangle.

Figure 2:
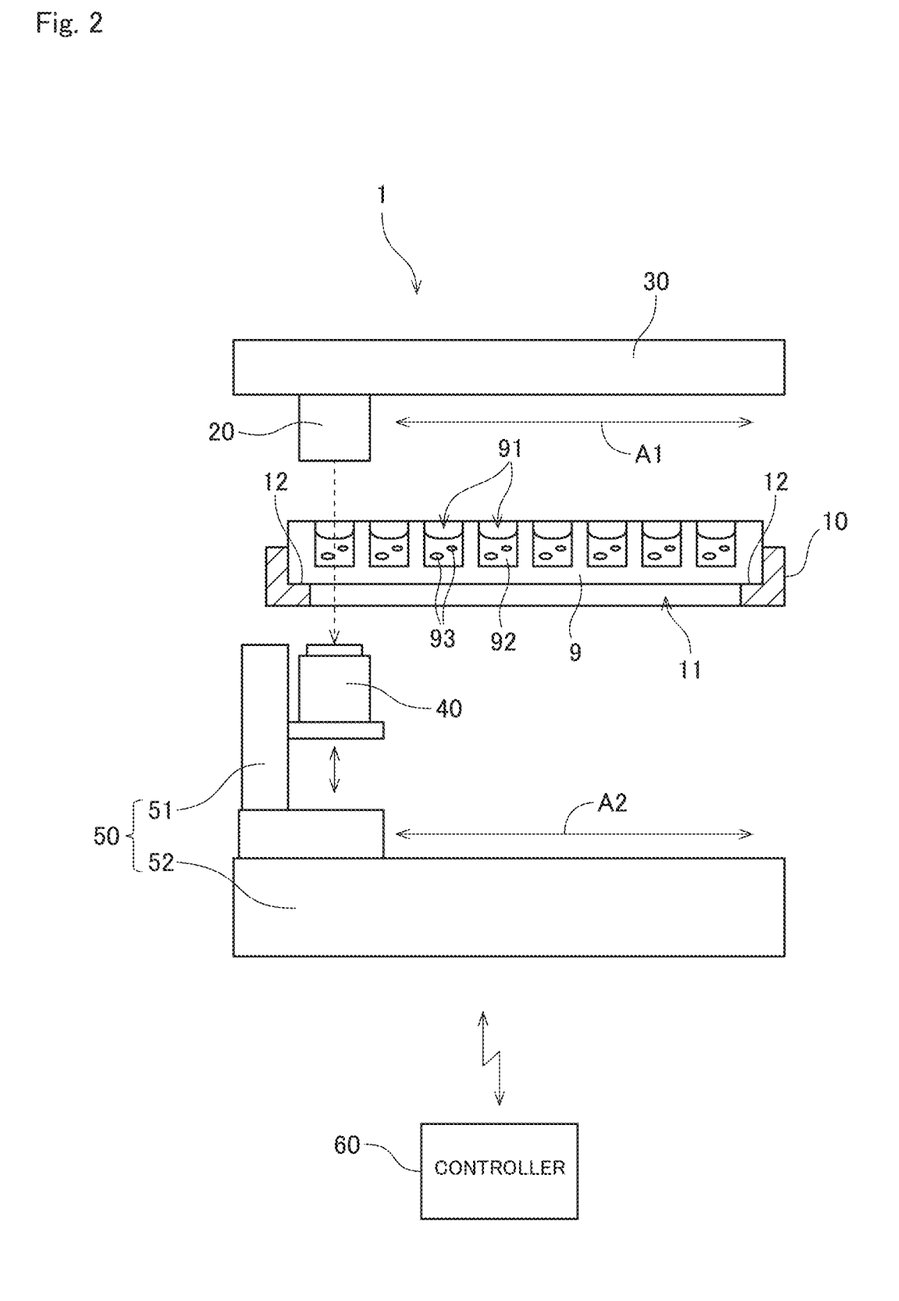
FIG. 2 illustrates a configuration of the image capturing device.

FIG. 2 illustrates a configuration of the image capturing device 1 according to the present invention.

The image capturing device 1 is configured to capture images of the plurality of cells 93 in the well plate 9 a plurality of times while changing the focal position of a camera 40 so as to generate image data of the cells 93. The image capturing device 1 is used in, for example, a screening process of narrowing down chemical compounds serving as candidates for pharmaceuticals in the field of research and development of pharmaceuticals. In the screening process, a person in charge adds chemical compounds having different concentrations or compositions to the plurality of wells 91 in the well plate 9. Then, the image capturing device 1 acquires image data of cells 93 in each well 91 in the well plate 91. Thereafter, culture conditions of the cells 93 are compared and analyzed on the basis of the acquired image data so as to verify the effects of the chemical compounds added to the culture solution 92.

The image capturing device 1 may also be used in research and development of pluripotent stem cells such as IPS cells or ES cells to observe cell differentiation, for example.

The image capturing device 1 includes a stage 10, a projector 20, a projector moving mechanism 30, the camera 40, a camera moving mechanism 50, and a controller 60.

The stage 10 is a pedestal that holds the well plate 9. The position of the stage 10 in the image capturing device 1 is fixed at least during image capture. The stage 10 has a rectangular opening 11 penetrating in the up-down direction in the center. The stage 10 also has an annular supporting surface 12 at the edge of the opening 11. The well plate 9 is fitted in the opening 11 and horizontally supported by the supporting surface 12. The top and bottom of each well 91 are thus exposed without being blocked by the stage 10.

The projector 20 is disposed above the well plate 9 held on the stage 10. The projector 20 has a light source such as LEDs. The light source in the projector 20 emits light during image capture. Thus, light is emitted downward from the projector 20. Note that the projector 20 only needs to emit light toward the well plate 9 from the side opposite the camera 40. Thus, the projector 20 may be configured such that its light source itself is disposed at a position off the top of the well plate 9, and light is applied to the well plate 9 via an optical system such as a mirror.

The projector moving mechanism 30 is a mechanism for moving the projector 20 horizontally along the upper surface of the well plate 9 held on the stage 10. For example, the projector moving mechanism 30 is a mechanism for converting rotational motion of a motor into rectilinear motion via a ball screw. The image capturing device 1 can dispose the projector 20 at a position above each well 91 by operating the projector moving mechanism 30. In FIG. 2, only one direction indicated by an arrow A1 is illustrated as the direction of movement of the projector 20. However, the projector moving mechanism 30 may be configured to move the projector 20 in two directions (left-right and depth directions in FIG. 2) along the upper surface of the well plate 9.

The camera 40 is disposed below the well plate 9 held on the stage 10. The camera 40 includes an optical system such as a lens and an image sensor such as a CCD or a CMOS. During image capture, the camera 40 captures an image of part of the well plate 9 while the projector 20 applies light toward that part of the well plate 9. Accordingly, images of the cells 93 in the well plate 9 can be acquired in the form of digital data. The captured image is input from the camera 40 to the controller 60.

The camera moving mechanism 50 is a mechanism for changing the height and horizontal position of the camera 40 while maintaining the posture of the camera 40. The camera moving mechanism 50 includes an up-and-down movement mechanism 51 and a horizontal movement mechanism 52.

The up-and-down movement mechanism 51 changes the height of the camera 40 by moving the camera 40 up and down. This changes the distance between the camera 40 and the well plate 9 held on the stage 10 (i.e., shooting distance between the cells 93 and the camera 40). As a result, it is possible to move the focal position of the camera 40 up and down along the optical axis.

The horizontal movement mechanism 52 moves the camera 40 and the up-and-down movement mechanism 51 horizontally as an integral unit. By operating the horizontal movement mechanism 52, the image capturing device 1 can dispose the camera 40 at a position under each well 91. Note that in FIG. 2, only one direction indicated by an arrow A2 is illustrated as the direction of movement of the camera 40 caused by the horizontal movement mechanism 52. However, the camera moving mechanism 50 may be configured to move the camera 40 in two directions (left-right and depth directions in FIG. 2) along the lower surface of the well plate 9.

The projector moving mechanism 30 and the horizontal movement mechanism 52 described above are driven in synchronization. Accordingly, the projector 20 and the camera 40 are always disposed at the same position when viewed from above. That is, the projector 20 and the camera 40 move the same distance in the same direction, and when the camera 40 is disposed at a position under a given well 91, the projector 20 is always disposed at a position above that well 91.

Figure 3:
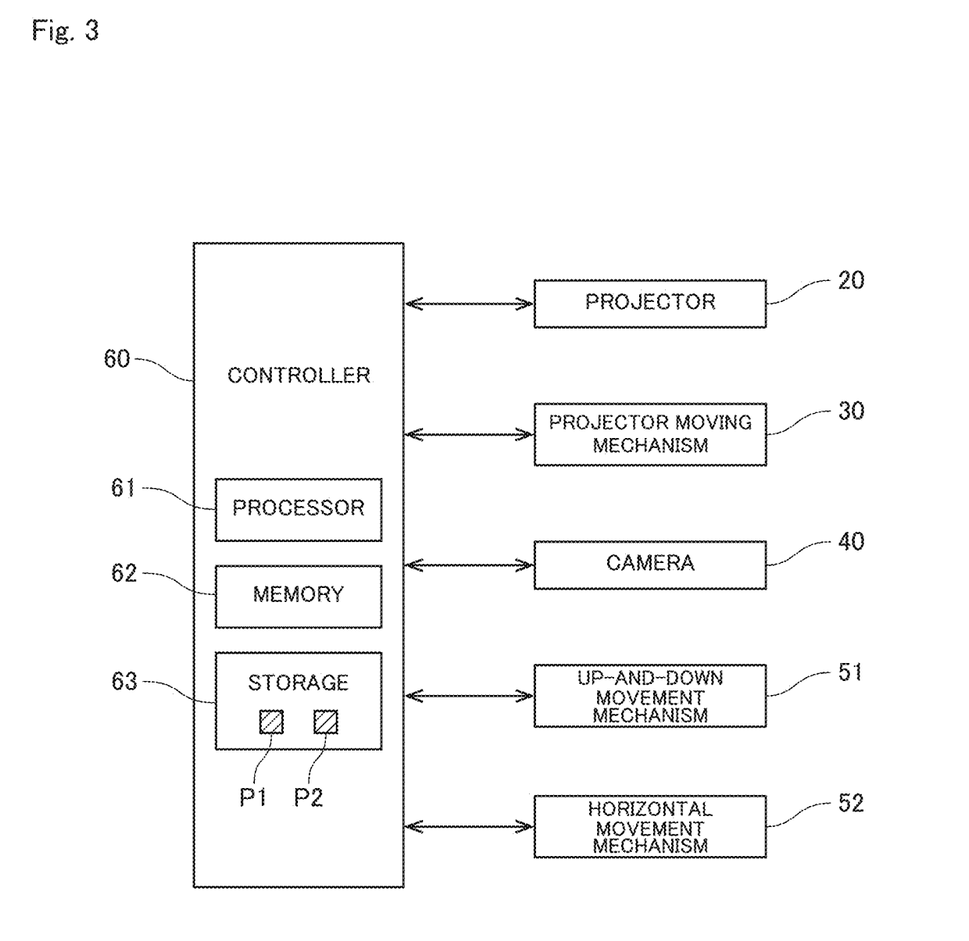
FIG. 3 is a block diagram illustrating connection between a controller and each part of the image capturing device.

The controller 60 is configured by, for example, a computer. The controller 60 has the function of controlling the operation of each part of the image capturing device 1 and the function of performing image processing on the image data acquired by the image capture with the camera 40. FIG. 3 is a block diagram illustrating connection between the controller 60 and each part of the image capturing device 1. As schematically illustrated in FIG. 3, the controller 60 includes a processor 61 such as a CPU, a memory 62 such as a RAM, and a storage 63 such as a hard disk drive. The storage 63 stores a program P1 for controlling the operation of each part of the image capturing device 1, and a program P2 for performing image processing on the image data.

Also, the controller 60 is communicably connected to each of the projector 20, the projector moving mechanism 30, the camera 40, the up-and-down movement mechanism 51, and the horizontal movement mechanism 52, which are described above. The controller 60 controls the operation of each part described above in accordance with the program P1. Accordingly, processing for capturing an image of the cells 93 held in each well 91 of the well plate 9 proceeds. The controller 60 also processes image data that is input from the camera 40, in accordance with the program P2 so as to detect the edge of the well 91 or to acquire image data of the cells 93 in the well 91. The edge of the well 91 refers to the boundary between the inner wall of the well 91 and its surroundings in the well plate 9.

2. Image Processing

In the case of capturing images of the well plate 9, each well 91 and its surrounding are captured. Thus, in the case of acquiring image data of the cells 93 in each well 91, it is necessary to first detect the edge of the well 91 in the well plate 9. The image capturing device 1 performs processing for detecting the edge of each well 91 from the image data acquired by image capture of the well plate 9 (this processing is hereinafter referred to as "edge detection processing"). Hereinafter, the edge detection processing will be described.

Figure 4:
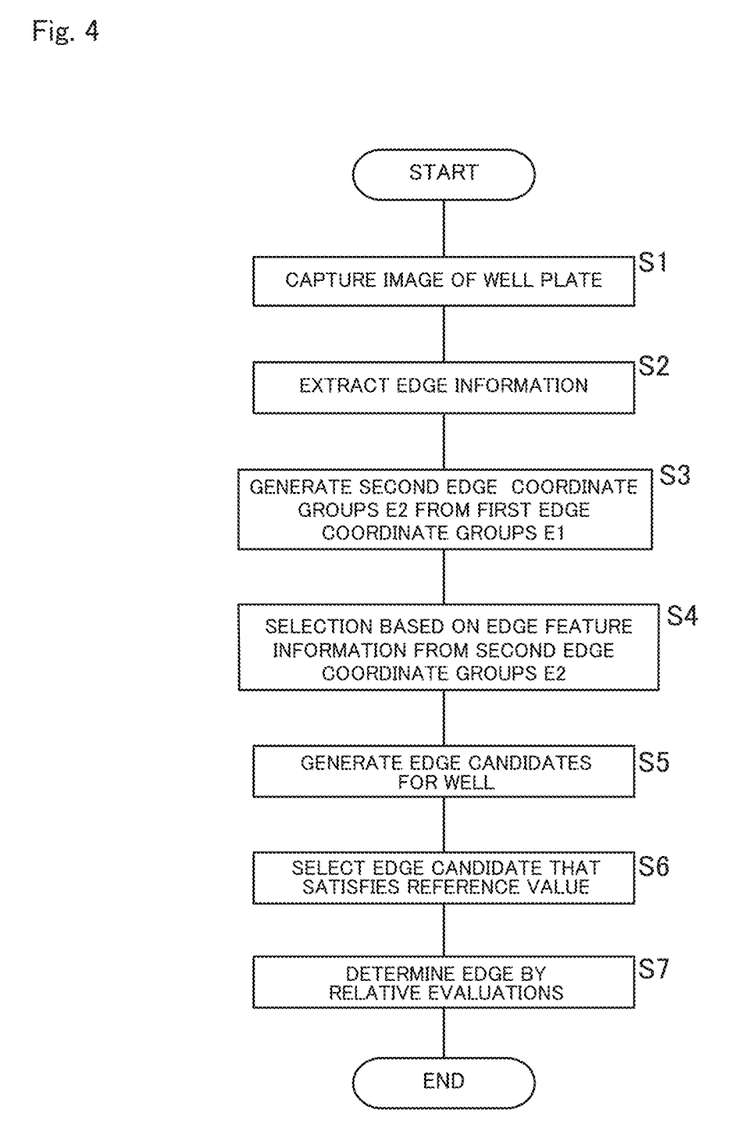
FIG. 4 is a diagram illustrating a flowchart of edge detection processing

FIG. 4 is a diagram illustrating a flowchart of the edge detection processing. The following description is given with reference to this flowchart.

The controller 60 captures images of the well plate 9 with the camera 40 (step S1). Then, the controller 60 extracts edge information on one well 91 from image data acquired by the image capture (step S2). The edge information is pixel information for specifying the edge of the well 91. Thus, in principle, one piece of edge information is supposed to be extracted for one well 91. However, in the processing in step S2, pixels that are irrelevant to the edge of the well 91 may also be extracted as edge information due to the influence of, for example, light refraction or the cells 93. If a plurality of pieces of edge information is extracted for one well 91, it is difficult to detect an accurate edge. In view of this, the following processing is performed in order to narrow a plurality of pieces of edge information down to one piece of edge information that satisfies predetermined conditions, and then processing for determining the edge of the well 91 is performed.

The edge information includes edge coordinate groups and edge feature information. The edge coordinate groups are groups of coordinate data pieces that are extracted based on a change in the luminance of each pixel in the image data. For the detection of such edge coordinates, known edge detection processing can be used. The edge feature information is information that represents the features of edges specified by the edge coordinate groups. The edge feature information includes the directions of edges specified by the edge coordinate groups, the intensities of the edges, the numbers of pixels that constitute the edges, and maximum luminance and minimum luminance at the edges. Note that the edge feature information may include all of the aforementioned features, or may include any one or more of those features.

Figure 5:
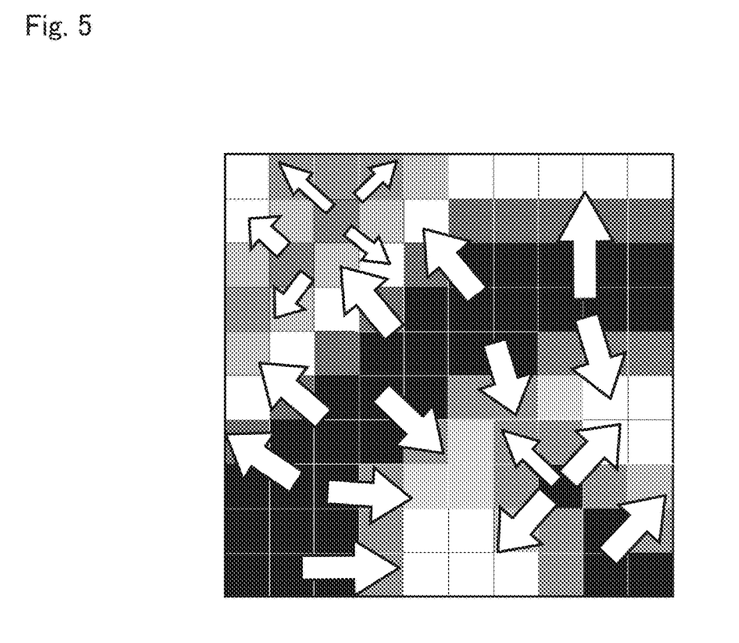
FIG. 5 illustrates an image for describing edge feature information.

FIG. 5 illustrates an image for describing the edge feature information. FIG. 5 illustrates part of image data obtained by image capture of a well 91 with the camera 40. In this diagram, the luminance of each pixel is represented as density. That is, it is shown that as the pixel becomes closer to black, the pixel has lower luminance.

The edge directions are the directions of edges specified by edge coordinates. In FIG. 5, the edge directions are indicated by open arrows. These edge directions are directions coming from pixels specified by edge coordinates (hereinafter, referred to as "pixels of interest") to pixels having higher luminance. For example, the controller 60 calculates differences in luminance between each pixel of interest and its surrounding pixels and detects, as an edge direction, a direction in which there is a largest difference from among the calculated differences.

The edge intensities are differences between maximum luminance and minimum luminance at the edges. In FIG. 5, the edge intensities are represented as the thicknesses of the open arrows. Note that the edge intensities may be set as the luminance of each pixel of interest, or may be set as differences in luminance between each pixel of interest and its surrounding pixels.

The numbers of pixels that constitute the edges are each the number of pixels that continuously change in luminance in the edge direction from the pixel of interest. In FIG. 5, the numbers of pixels that constitute the edges are represented as the lengths of the open arrows.

The maximum luminance and minimum luminance at the edges are maximum luminance and minimum luminance among pixels that constitute the edges.

Referring back to FIG. 4, the controller 60 uses a known ideal diameter D to perform processing for extracting edge coordinates from among an edge coordinate group for each edge coordinate group in the edge information (step S3). The storage 63 stores central coordinates X and the ideal diameter D in advance. The central coordinates X are, for example, anticipated arbitrary central coordinates of the well 91 in the image data. The ideal diameter D is a design well diameter (so-called catalog value) for the well plate 9 that is set in the image capturing device 1. The edge coordinate groups in the edge information extracted in step S2 are hereinafter referred to as "first edge coordinate groups E1."

The controller 60 calculates a distance Dw between the central coordinates X and one edge coordinates in a first edge coordinate group E1. Then, the controller 60 determines whether a difference between the distance Dw and the ideal diameter D is within tolerance. If the difference is within tolerance, the controller 60 extracts this edge coordinates from the first edge coordinate group E1. If the difference is out of tolerance, the controller 60 determines that the distance Dw of this edge coordinates from the central coordinates X is too far away from a distance that is calculated by adding a predetermined permissible value to the ideal diameter D, and excludes this edge coordinates from targets for processing. The controller 60 performs the above-described processing for each edge coordinates in the first edge coordinate group E1. The controller 60 stores the edge coordinates extracted from the first edge coordinate group E1 as a second edge coordinate group E2. That is, this step S3 is processing for eliminating information that is included in the first edge coordinate group E1 but clearly irrelevant to information for specifying the edge of the well 91.

The controller 60 performs processing for generating the second edge coordinate group E2 for all the first edge coordinate groups E1 that are included in the edge information. When storing a generated second edge coordinate group E2, the controller 60 also stores the edge feature information extracted in step S2 in association therewith.

Next, the controller 60 performs processing for selecting edge coordinate groups from among the second edge coordinate groups E2 generated in step S3 on the basis of the edge feature information (step S4).

Figure 6:
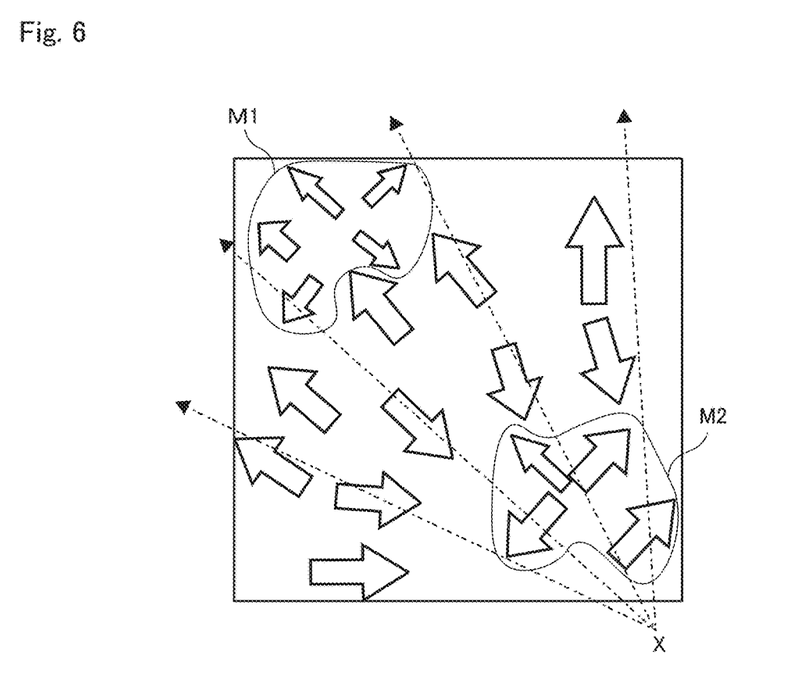
FIG. 6 illustrates an image for describing selection based on the edge feature information.

FIG. 6 illustrates an image for describing the selection based on the edge feature information. In FIG. 6, only the edge feature information is illustrated, and the image data in FIG. 5 is not shown.

In the processing in step S4, for example in the case where each edge intensity in the edge feature information that corresponds to one second edge coordinate group E2 is greater than or equal to a threshold value, the controller 60 selects this second edge coordinate group E2. Here, the controller 60 may be configured to select a corresponding second edge coordinate group E2 in the case where all the edge intensities included in the edge feature information are greater than or equal to the threshold value. As another alternative, the controller 60 may be configured to select a corresponding second edge coordinate group E2 according to the ratio between the number of information pieces about edge intensities that are included in the edge feature information and the number of information pieces about edge intensities that are greater than or equal to the threshold value. The threshold value can be appropriately changed depending on various factors such as the resolution of the camera 40 and image capture environments.

In the case of FIG. 6, the controller 60 excludes the edge coordinate group indicated by a curve M1 from selection, after having determined that all edge intensities corresponding to this edge coordinate group are less than the threshold value.

In the case where each edge direction in the edge feature information that corresponds to one second edge coordinate group E2 matches the direction coming from the central coordinates X to the pixel of interest (directions indicated by dashed arrows in FIG. 6), the controller 60 selects this second edge coordinate group E2. As described previously, the central coordinates X are anticipated arbitrary central coordinates of the well 91 in the image data.

In the case of FIG. 6, a large number of edge directions that correspond to the edge coordinate group indicated by a curve M2 do not match the directions coming from the central coordinates X to the pixels of interest. Thus, the controller 60 excludes this second edge coordinate group E2 from selection. Here, the controller 60 may be configured to exclude a corresponding second edge coordinate group E2 from selection if any one of the edge directions deviates from the direction coming from the central coordinates X to the pixel of interest, or may be configured to exclude a corresponding second edge coordinate group E2 from selection according to the ratio of the number of edge directions that deviate from the directions coming from the central coordinates X to the pixels of interest.

In the case where the edge directions do not vary but include opposite directions, the controller 60 excludes a corresponding edge coordinate group from selection. For example, although not shown, in the case where one edge direction in the edge feature information is represented by an arrow coming from the pixel of interest to the central coordinates X and another edge direction is represented by an arrow coming from the central coordinates X to the pixel of interest, the controller 60 excludes this edge coordinate group from selection.

Also, the controller 60 may be configured to exclude a corresponding edge coordinate group from selection in the case where there are variations in the numbers of pixels that constitute the edge and in the maximum luminance and minimum luminance at the edge.

In this way, the edge feature information is used to select the second edge coordinate groups E2. Thus, even if edge coordinates (e.g., edge coordinate group indicated by the curve M1 in FIG. 6) that include disturbance elements originating from, for example, foreign substances or the cells 93 in the well 91 are extracted, it is possible to eliminate these edge coordinates.

In the following description, edge coordinate groups that are selected from among the second edge coordinate groups E2 in step S4 are referred to as "third edge coordinate groups E3."

Figure 7:
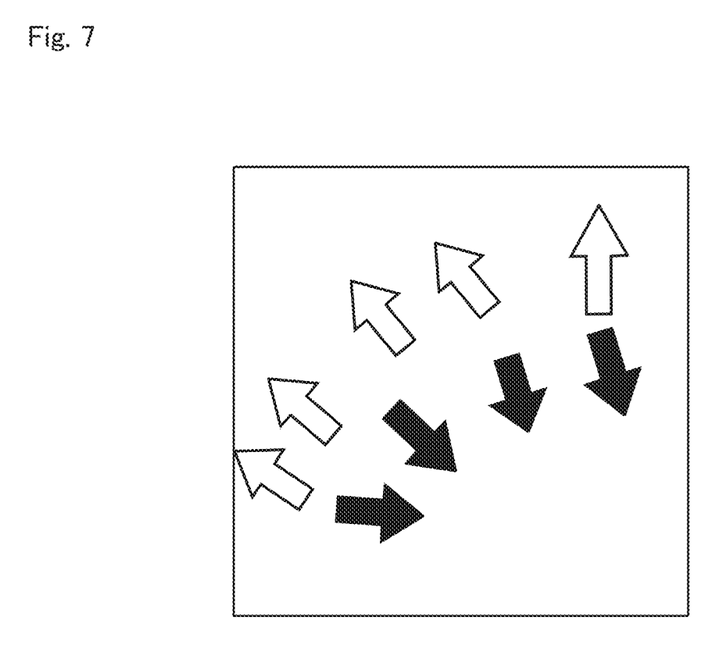
FIG. 7 illustrates an image for describing edge coordinate groups that are selected based on the edge feature information.

FIG. 7 illustrates an image for describing the third edge coordinate groups E3 that are selected based on the edge feature information. FIG. 7 illustrates an example in which one edge coordinate group corresponding to the edge feature information indicated by open arrows and another edge coordinate group corresponding to the edge feature information indicated by solid arrows are selected. The open arrows have approximately the same edge direction, approximately the same edge intensity, and approximately the same number of pixels that constitute the edge. Also, the solid arrows have approximately the same edge direction, approximately the same edge intensity, and approximately the same number of pixels that constitute the edge.

Referring back to FIG. 4, the controller 60 employs polynomial approximation using a least-square method for the third edge coordinate groups E3 selected in step S4 to generate edge candidates for the well 91 (step S5). That is, edge candidates to be generated are approximated curves of the edge coordinates in third edge coordinate groups E3. Since the well 91 has a circular shape, the edge candidates for the well also have circular shapes. For example, letting (a, b) be the central coordinates of the well 91 and r be the radius of the well 91, the coefficients a, b, and r are calculated using each edge coordinates in the third edge coordinate groups E3 and a polynomial of the form $(x-a)^2+(y-b)^2=r^2$.

The controller 60 repeats the above-described processing of steps S3 to S5 while moving the central coordinates X by an amount corresponding to an anticipated amount of position shift.

Figure 8:
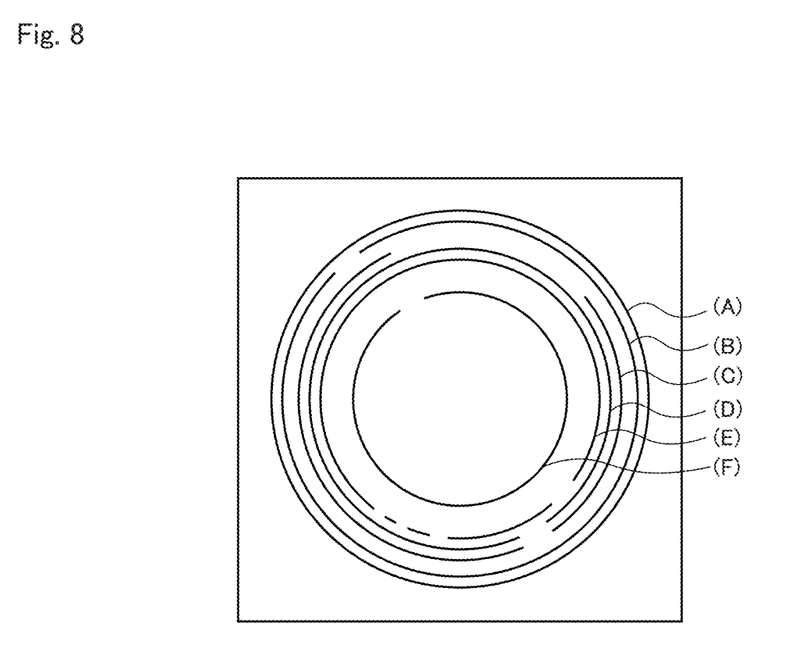
FIG. 8 illustrates an image of edge candidates that are generated by polynomial approximation.

FIG. 8 illustrates an image of edge candidates generated using polynomial approximation. In the present embodiment, it is assumed that a plurality of edge candidates is generated as a result of the processing of steps S2 to S5. FIG. 8 illustrates a case in which edge candidates (A), (B), (C), (D), (E), and (F) are generated.

Referring back to FIG. 4, the controller 60 uses a reference value that serves as an absolute indicator to select edge candidates that satisfy the reference value from among the plurality of edge candidates (A) to (F) generated in step S4 (step S6). Examples of the absolute indicator will be described hereinafter.

First Example of Absolute Indicator

In the first example, a statistic that measures distances between each edge candidate and its neighborhood edge coordinates is used as an absolute indicator. To be more specific, a permissible value (first permissible value) for the distance between each edge coordinates in a third edge coordinate group E3 and an edge candidate generated by approximation of this third edge coordinate group E3 is used as an absolute indicator. If a large number of edge coordinates in the third edge coordinate group E3 deviate extremely from the approximated edge candidate, the reliability of that third edge coordinate group E3 is low. Thus, the controller 60 calculates the distance between each edge coordinates in a third edge coordinate group E3 and the edge candidate generated by approximation of this third edge coordinate group E3. Then, if the number of edge coordinates whose calculated distances are less than or equal to the permissible value is greater than or equal to one-half or one-third of an ideal edge number that is calculated from the ideal well diameter, the controller 60 selects the edge candidate used for the calculation as an edge candidate that satisfies the reference value. It should be noted that the numerical values of "one-half" and "one-third" are merely examples, and the present invention is not limited to these values.

Second Example of Absolute Indicator

In the second example, a permissible value for a selection indicator that is calculated from the edge information constituting each edge candidate is used as an absolute indicator. The calculation of the selection indicator will be described hereinafter.

As described previously, the edge candidates are approximate curves generated from a plurality of edge coordinates. Thus, if it is not possible to extract edge coordinates, the edge information constituting an edge candidate includes missing values as illustrated in FIG. 8. The controller 60 measures the number N1 of effective pixels. The controller 60 also calculates the length of the circumference of the edge candidate from the ideal diameter D and estimates a total number N2 of pixels on the circumference of the edge candidate from the length of the circumference. Then, the controller 60 calculates a ratio (N1/N2) of the number N1 of effective pixels to the estimated total number N2 of pixels.

The controller 60 further divides the circumference of the edge candidate equally into, for example, eight parts. Then, the controller 60 measures the number N3 of continuous effective pixels on each divided part of the circumference. The controller 60 calculates the number N4 of pixels on each divided part of the circumference from the estimated total number N2 of pixels as described above. Then, the controller 60 calculates a ratio (N3/N4) of the number N3 of continuous effective pixels to the number N4 of pixels. The controller 60 calculates this ratio (N3/N4) for each divided part of the circumference of the edge candidate and selects the lowest ratio from among the calculated ratios.

The controller 60 then multiples the calculated ratio (N1/N2) and the selected ratio (N3/N4) together and sets the multiplied result (N1·N3)/(N2·N4) as a selection indicator.

If the calculated selection indicator is greater than or equal to a permissible value (second permissible value), the controller 60 selects the edge candidate used for the calculation as an edge candidate that satisfies the reference value. If the edge candidate is generated from edge information that includes a small number of effective pixels, the reliability of this edge candidate is low. That is, in this example, it is possible to exclude edge candidates that have low reliability.

Third Example of Absolute Indicator

In the third example, a tolerance (first tolerance) value for the difference between the diameter of each edge candidate and the ideal diameter D of the well 91 is used as an absolute indicator. As described previously, the ideal diameter D is a catalog value of the well 91. If the diameter of the edge candidate is extremely different from the ideal diameter D, the reliability of this edge candidate is low. Thus, the controller 60 calculates a difference between the diameter of each edge candidate and the ideal diameter D of the well 91. If this difference is within tolerance, the controller 60 selects the edge candidate used for the calculation as an edge candidate that satisfies the reference value.

Fourth Example of Absolute Indicator

In the fourth example, a tolerance (second tolerance) value for the amount of discrepancy between the central coordinates of each edge candidate and the preset central coordinates X is used as an absolute indicator. If there is a large discrepancy between the central coordinates of an edge candidate and the anticipated central coordinates X of the well 91, the reliability of this edge candidate is low. Thus, the controller 60 calculates the amount of discrepancy between the central coordinates of each edge candidate and the central coordinates X. If the calculated amount of discrepancy is within tolerance, the controller 60 selects the edge candidate used for the calculation as an edge candidate that satisfies the reference value.

The controller 60 uses at least one of the absolute indicators described in the above first to fourth examples and selects edge candidates that satisfy the reference value from among a plurality of edge candidates.

Figure 9:
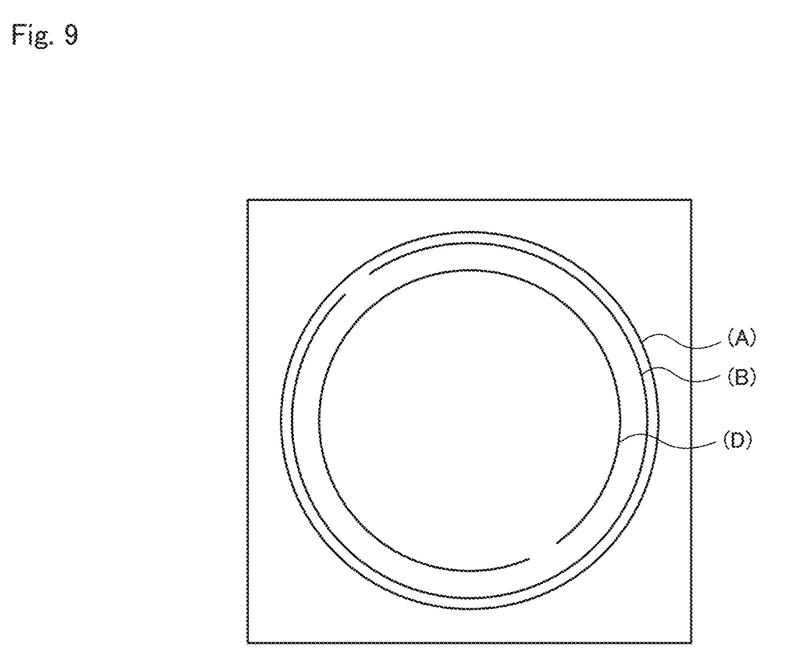
FIG. 9 illustrates an image of edge candidates that are selected using an absolute indicator.

FIG. 9 illustrates an image of edge candidates that are selected using an absolute indicator.

FIG. 9 illustrates an example in which the edge candidates (A), (B), and (D) are selected as a result of the processing described in step S6. The edge candidates (C) and (E) in FIG. 8 are excluded from selection because their selection indicators, each calculated from the number of effective pixels in the edge coordinate, are regarded as being less than the permissible value. Also, the edge candidate (F) in FIG. 8 is excluded from selection because the difference between the diameter of the edge candidate and the ideal diameter D is out of tolerance.

Referring back to FIG. 4, the controller 60 conducts relative evaluations on each edge candidate selected in step S6 and determines the edge of the well 91 from among the plurality of edge candidates (step S7). Three examples of the relative evaluations will be described hereinafter.

First Example of Relative Evaluations

In the first example, the controller 60 determines an edge candidate that has a smallest diameter among the edge candidates selected in step S6 as the edge of the well 91. In the case where an image of the well 91 is captured with the camera 40, edge information may be detected on the outer side of the edge of the well 91 due to factors such as the wall thickness of the well 91. In view of this, the controller 60 selects an edge candidate having a smallest diameter. In the case of this example, the edge candidate (D) is selected in FIG. 9.

In this example, the edge feature information is also used in addition to the information about the diameter. For example, in the case where one edge candidate has great variations in edge intensities, edge directions, or maximum luminance and minimum luminance at the edge, this one edge candidate is excluded from selection even if it has a smaller diameter than the other edge candidates.

Second Example of Relative Evaluations

In the second example, the controller 60 uses a combination of a score value and the diameter of each edge candidate to determine the boundary of the well 91. The score value used in this example is obtained by multiplying the above-described selection indicator, a statistic that measures the distances between each edge candidate and its neighborhood edge coordinates, and a feature value calculated from an edge feature amount together after applying predetermined weighing to each of these values. For example, it is assumed in FIG. 9 that the edge candidate (A) has a score value of 1.0 and a diameter of 5, the edge candidate (B) has a score value of 0.7 and a diameter of 4, and the edge candidate (D) has a score value of 0.3 and a diameter of 2. In this case, the controller 60 excludes the edge candidate (D) as having a relatively low score value. Then, the controller 60 selects the edge candidate (B) having a smaller diameter out of the edge candidates (A) and (B).

Alternatively, the controller 60 may be configured to determine an edge candidate that has a highest score value as the boundary of the well 91.

The controller 60 conducts at least one of the relative evaluations described in the above first and second examples and determines the edge candidate selected from among a plurality of edge candidates as the edge of the well 91.

Figure 10:
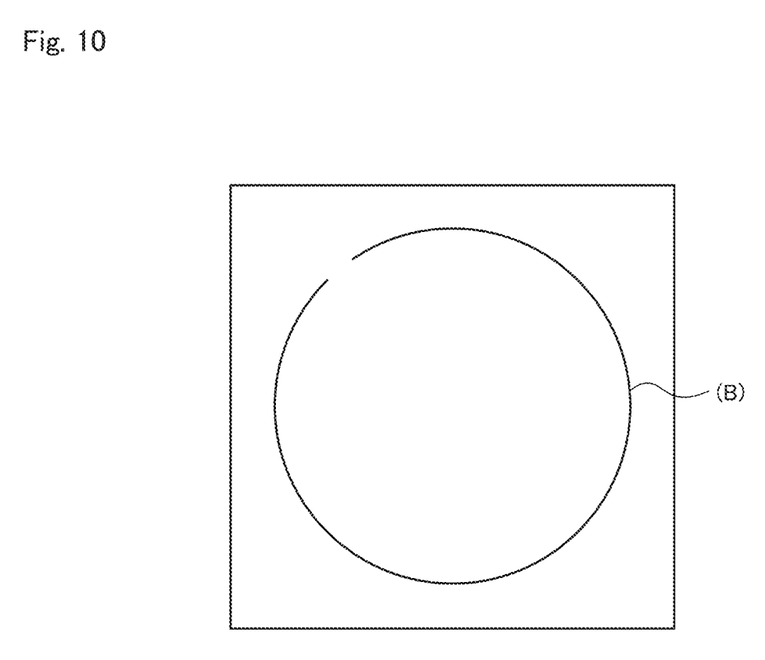
FIG. 10 illustrates an image of an edge candidate that is determined by relative evaluations.

FIG. 10 illustrates an image of an edge candidate that is determined through relative evaluations.

FIG. 10 illustrates an example in which the edge candidate (B) in FIG. 9 is selected as a result of the processing described in the second example of the relative evaluations. The edge candidate (A) in FIG. 9 is excluded from selection as having a large diameter, and the edge candidate (D) is excluded from selection as having a small score value.

In the relative evaluations in step S7, if the central coordinates of a plurality of edge candidates include central coordinates that deviate extremely from the other central coordinates, the controller 60 may exclude an edge candidate having this central coordinates from selection.

As described above, even if a plurality of edge coordinate groups is detected due to the influence of, for example, light refraction or the cells 93, unnecessary edge information can be eliminated by applying a plurality of conditions in stages. As a result, the edge of the well 91 can be determined accurately. Accordingly, it is possible to accurately analyze the cells 93 in the well 91.

For example, even if edge coordinates (e.g., edge coordinate group indicated by the curve M1 in FIG. 6) that include disturbance elements originating from, for example, foreign substances or cells 93 in the well 91 are extracted, it is possible to eliminate those edge coordinates by selecting the second edge coordinate groups E2 with use of the edge feature information. Also, unnecessary edge information can be eliminated by using an absolute indicator. Moreover, the relative evaluations with reference to other edge candidates enable eliminating an edge candidate that satisfies an absolute indicator but differs extremely from the other edge candidates. That is, it is possible to eliminate edge candidates that satisfy one condition but include abnormal components. As a result, the edge of the well 91 can be detected accurately even if the well edge has a complicated shape or it is not possible to obtain clear image data.

Also, highly robust edge detection is made possible by using polynomial approximation to generate edge candidates. Moreover, the use of the polynomial approximation enables eliminating edge coordinates that have been detected due to the influence of, for example, the cells 93.

3. Variations

While one embodiment of the present invention has been described above, the present invention is not intended to be limited to the above-described embodiment.

For example, in order to increase the processing speed, image data may be reduced in size during image processing in order to narrow the range of processing. Also, pixels do not necessarily have to be processed one by one during image processing, and image processing may be performed using a plurality of pixels as a single unit.

While a least-square method is used for image processing in the above-described embodiment, other known techniques such as Hough transform or circular model fitting may be used.

While the well plate 9 is used in the above-described embodiment, a different specimen container other than the well plate 9 may be used.

Each element in the above-described embodiments and variations may be combined appropriately within a range that presents no contradictions.

REFERENCE SIGNS LIST

1 Image capturing device
9 Well plate

10 Stage
11 Opening
12 Supporting surface
20 Projector
30 Projector moving mechanism
40 Camera
50 Camera moving mechanism
51 Up-and-down movement mechanism
52 Horizontal movement mechanism
60 Controller
61 Processor
62 Memory
63 Storage
91 Well
92 Culture solution
93 Cell

The invention claimed is:

1. An image processing method of detecting an edge of an analysis region where an object is analyzed, from image data obtained by capturing an image of the analysis region and surroundings of the analysis region, the method comprising the steps of:
 a) extracting edge feature information that corresponds to an edge coordinate group for the analysis region, together with the edge coordinate group from the image data;
 b-1) in a case where a plurality of edge coordinate groups has been extracted in the step a), selecting one or more edge coordinate groups in accordance with the edge feature information from among the plurality of edge coordinate groups;
 b-2) in a case where one or more edge coordinate groups has been selected in the step b-1), generating edge candidates for the analysis region from each of the selected one or more edge coordinate groups, wherein the edge candidates are approximated curves of the selected one or more edge coordinate groups;
 c) selecting an approximated curve that satisfies a predetermined reference value from among the approximated curves generated in the step b-2); and
 d) in a case where a plurality of approximated curves has been selected in the step c), conducting relative evaluations to determine an approximated curve which is the edge of the analysis region from among the plurality of approximated curves.

2. The image processing method according to claim 1, wherein
 in the step b), edge candidates are generated using polynomial approximation for each of the plurality of edge coordinate groups.

3. The image processing method according to claim 2, wherein
 in the step c), an edge candidate is selected that is generated from an edge coordinate group that includes a predetermined number or more of edge coordinates whose distances from the edge candidate is less than or equal to a first permissible value.

4. An image processing method of detecting an edge of an analysis region where an object is analyzed, from image data obtained by capturing an image of the analysis region and surroundings of the analysis region, the method comprising the steps of:
 a) extracting an edge coordinate group for the analysis region from the image data;
 b) in a case where a plurality of edge coordinate groups has been extracted in the step a), generating edge candidates for the analysis region from each of the plurality of edge coordinate groups;
 c) selecting an edge candidate that satisfies a predetermined reference value from among the edge candidates generated in the step b); and
 d) in a case where a plurality of edge candidates has been selected in the step c), conducting relative evaluations to determine the edge of the analysis region from among the plurality of edge candidates,
 wherein the step c) includes the steps of:
 c1) for each of the edge candidates generated in the step b), detecting the number of missing edge coordinates that are used to specify the edge candidate;
 c2) for each the edge candidates generated in the step b), detecting a missing range where the edge coordinates are missing continuously;
 c3) calculating a selection indicator from the detected number of missing edge coordinates and the detected missing range; and
 c4) selecting an edge candidate whose calculated selection indicator is greater than or equal to a second permissible value.

5. The image processing method according to claim 1, wherein
 in the step c), a statistic that measures distances between each of the edge candidates generated in the step b) and neighborhood edge coordinates of the edge candidate is calculated, and an edge candidate is selected based on the calculated statistic.

6. The image processing method according to claim 1, wherein
 the analysis region has a circular shape,
 the method further comprising the step of:
 e) acquiring an ideal diameter of the analysis region, the ideal diameter being stored in advance,
 wherein in the step c), an edge candidate whose diameter is within a first tolerance of the ideal diameter is selected from among the edge candidates generated in the step b).

7. The image processing method according to claim 6, wherein
 in the step c), an edge candidate whose central coordinates are within a second tolerance from predetermined central coordinates is selected from among the edge candidates generated in the step b).

8. The image processing method according to claim 6, wherein
 in the step d), an edge candidate that has a smallest diameter among the edge candidates is determined as the edge of the analysis region.

9. The image processing method according to claim 6, wherein
 in the step d), the edge of the analysis region is determined by detecting central coordinates that are located outside a predetermined range from among central coordinates of the edge candidates, and excluding an edge candidate whose central coordinates are located outside the predetermined range from among the edge candidates.

10. The image processing method according to claim 1, wherein
 in the step d), a score value is calculated for each of the edge candidates generated in the step b), and the edge of the analysis region is determined based on the calculated score value.

11. An image processing method of detecting an edge of an analysis region where an object is analyzed, from image data obtained by capturing an image of the analysis region and surroundings of the analysis region, the method comprising the steps of:

a) extracting edge feature information that corresponds to an edge coordinate group for the analysis region, together with the edge coordinate group, from the image data;

b) in a case where a plurality of edge coordinate groups has been selected in the step a), selecting an edge coordinate group in accordance with the edge feature information from among the plurality of edge coordinate groups; and c) generating an approximated curve of the selected edge coordinate group, which is an edge candidate for the analysis region from the edge coordinate group selected in the step b).

12. The image processing method according to claim 11, wherein the edge feature information includes at least one of a direction of an edge direction specified by the edge coordinate group, an intensity of the edge, the number of pixels that constitute the edge, and maximum luminance and minimum luminance at the edge.

13. The image processing method according to claim 11, wherein in the step c), an edge candidate is generated using polynomial approximation from the edge coordinate group.

14. The image processing method according to claim 11, further comprising the step of:

d) in a case where a plurality of edge coordinate groups has been selected in the step b) and a plurality of edge candidates has been generated in the step c), selecting an edge candidate in accordance with the edge feature information from among the plurality of edge candidates.

15. An image processor comprising:

a camera that captures an image of an analysis region where an object is analyzed, and surroundings of the analysis region; and a controller that processes image data obtained by image capture with the camera, wherein the controller executes the steps of:

a) extracting edge feature information that corresponds to an edge coordinate group for the analysis region, together with the edge coordinate group from the image data;

b-1) in a case where a plurality of edge coordinate groups has been extracted in the step a), selecting one or more edge coordinate groups in accordance with the edge feature information from among the plurality of edge coordinate groups;

b-2) in a case where one or more edge coordinate groups has been selected in the step b-1), generating edge candidates for the analysis region from each of the selected one or more edge coordinate groups, wherein the edge candidates are approximated curves of the selected one or more edge coordinate groups;

c) selecting an approximated curve that satisfies a predetermined reference value from among the approximated curves generated in the step b-2); and d) in a case where a plurality of approximated curves has been selected in the step c), conducting relative evaluations to determine an approximated curve which is the edge of the analysis region from among the plurality of approximated curves.

16. An image processor comprising:

a camera that captures an image of an analysis region where an object is analyzed, and surroundings of the analysis region; and a controller that processes image data obtained by image capture with the camera, wherein the controller executes the steps of:

a) extracting edge feature information that corresponds to an edge coordinate group for the analysis region, together with the edge coordinate group, from the image data;

b) in a case where a plurality of edge coordinate groups has been extracted in the step a), selecting an edge coordinate group in accordance with the edge feature information from among the plurality of edge coordinate groups; and c) generating an approximated curve of the selected edge coordinate group, which is an edge candidate for the analysis region from the edge coordinate group selected in the step b).

* * * * *